(12) United States Patent
Kowalczyk et al.

(10) Patent No.: US 8,103,175 B1
(45) Date of Patent: Jan. 24, 2012

(54) OPTICAL SIGNAL PROCESSING SYSTEMS AND METHODS FOR AMPLIFICATION AND/OR ATTENUATION

(75) Inventors: Anthony C. Kowalczyk, San Carlos, CA (US); Michael Enoch, Placitas, NM (US)

(73) Assignee: Lockheed Martin Corporation, Bethesda, MD (US)

( * ) Notice: Subject to any disclaimer, the term of this patent is extended or adjusted under 35 U.S.C. 154(b) by 701 days.

(21) Appl. No.: 12/175,411

(22) Filed: Jul. 17, 2008

(51) Int. Cl.
*H04B 10/04* (2006.01)
*H04B 10/12* (2006.01)
*H01S 3/00* (2006.01)

(52) U.S. Cl. .................. 398/200; 398/115; 359/334

(58) Field of Classification Search ............ 398/85, 398/115, 200; 359/334
See application file for complete search history.

(56) References Cited

U.S. PATENT DOCUMENTS

| | | | |
|---|---|---|---|
| 6,178,036 B1 * | 1/2001 | Yao | 359/334 |
| 7,167,614 B2 * | 1/2007 | Mangir et al. | 385/27 |
| 2001/0030796 A1 * | 10/2001 | Yao | 359/334 |
| 2008/0310464 A1 * | 12/2008 | Schneider | 372/22 |

* cited by examiner

*Primary Examiner* — Nathan Curs
(74) *Attorney, Agent, or Firm* — McDermott Will & Emery LLP

(57) ABSTRACT

An optical signal processing system is provided that includes a first light modulator for receiving, placing information on a first optical signal, and for producing a second optical signal. The second optical signal includes a desired signal portion and an undesired signal portion. The optical signal processing system includes a second light modulator that tunes a first optical pump signal to a Brillouin frequency that is less than, but corresponding to, a frequency of the undesired signal portion. The optical signal processing system includes a light conductor configured to receive as a first input the second optical signal and as a second input the first optical pump signal tuned to the Brillouin frequency. The optical signal processing system causes the first optical pump signal tuned to the Brillouin frequency to induce a Stimulated Brillouin Scattering effect at the light conductor to attenuate the undesired signal portion.

19 Claims, 14 Drawing Sheets

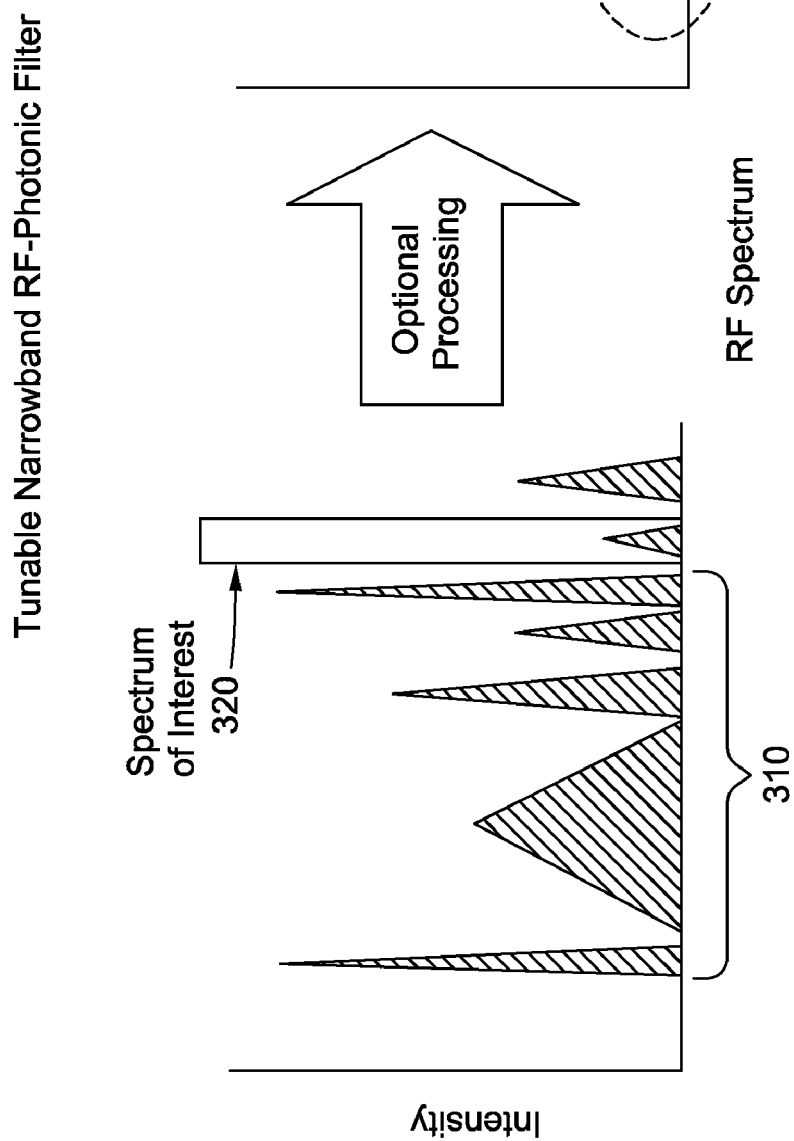

Amplification

Notch Filtering

Amplification and Notch Filtering

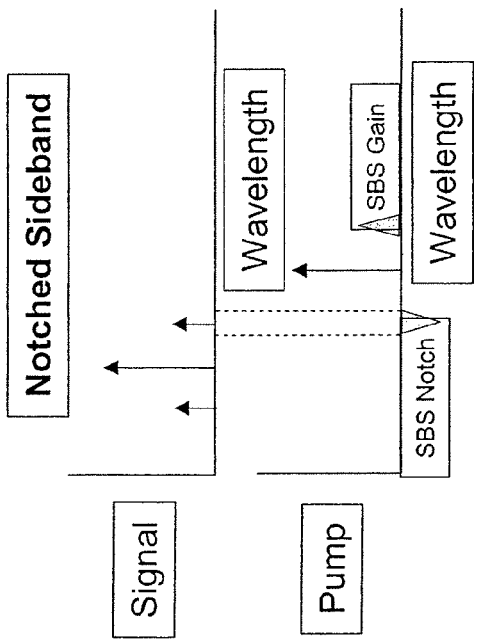
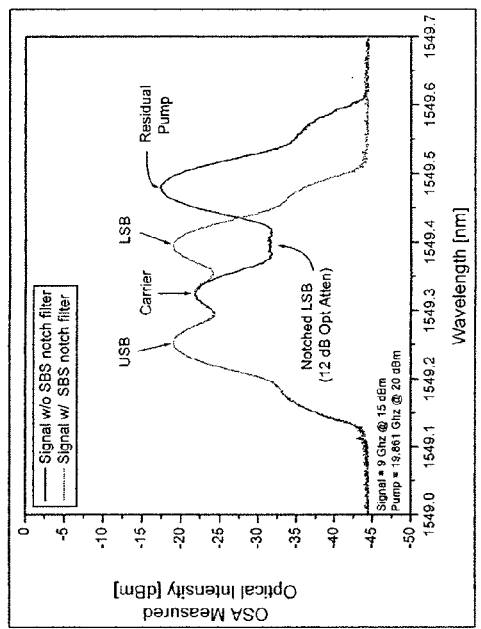
Fig. 12

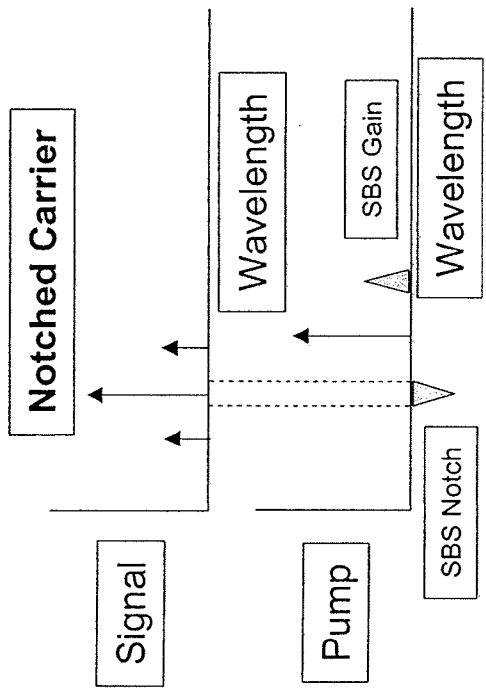
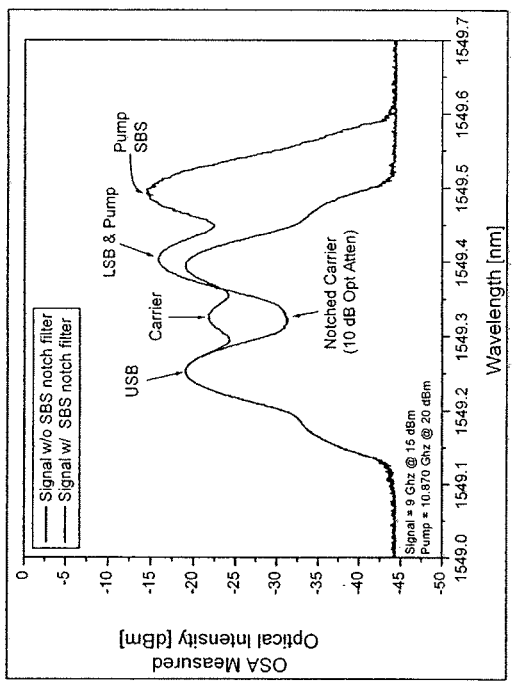
Fig. 13

OPTICAL SIGNAL PROCESSING SYSTEMS AND METHODS FOR AMPLIFICATION AND/OR ATTENUATION

STATEMENT REGARDING FEDERALLY SPONSORED RESEARCH OR DEVELOPMENT

Not applicable.

FIELD

The present invention generally relates to optical signal processing and, in particular, relates to optical signal processing systems and methods for amplification and/or attenuation.

BACKGROUND

Modulated signals often face distortion and interference during transmission. Radio frequency (RF) transmissions are particularly susceptible to distortion and interference. This is particularly true when considered against the backdrop of the entire RF frequency spectrum. Even when just considering a wideband portion of the entire spectrum, received bandwidths can be sufficiently large so that direct digitization of the entire bandwidth is simply not feasible using existing analog-to-digital conversion technology. Large information bandwidths (such as around 1 GHz) burden analog-to-digital converters and/or digital signal processors.

While certain signal processing techniques can assist in limiting distortion and interference, the fact remains that narrowband gain elements in the tens of Megahertz do not exist in the RF domain. Additionally, existing Raman narrowband optical gain techniques fail to include a notch filter capacity, and also use a large amount of laser pump power. Other techniques also pose problems. For instance, the usage of an Erbium Doped Fiber Amplifier (EDFA) fails to include a notch filter capacity, and also uses large amounts of laser pump power. Further, EDFA is wideband which lends itself to amplification of noise and interference along with desired signals.

SUMMARY

In one aspect of the disclosure, a photonic signal processing device is provided for narrowband amplification and/or narrowband tunable filtering. The photonic signal processing device may provide narrowband amplification in the optical domain and operate on RF signals. Simultaneously, the signal processing device may provide agile-tunable narrowband notch filtering, and may enjoy a lower laser pump power in comparison to existing Raman or EDFA techniques while also providing an excellent signal-to-noise ratio (e.g., 60 dB).

In an embodiment of the present invention, an optical signal processing system is provided that includes a first light modulator configured to receive a first optical signal. The first light modulator is configured to place information on the first optical signal, and is configured to produce, from at least the first optical signal and the information, a second optical signal comprising a first signal portion that is desired (a "desired signal portion") and a second signal portion that is not desired (an "undesired signal portion"). The optical signal processing system also includes a second light modulator configured to tune a first optical pump signal to a Brillouin frequency that is less than, but corresponding to, a frequency of the undesired signal portion. The optical signal processing system also includes a light conductor configured to receive as a first input the second optical signal and as a second input the first optical pump signal tuned to the Brillouin frequency. The optical signal processing system is configured to cause the first optical pump signal tuned to the Brillouin frequency to induce a Stimulated Brillouin Scattering effect at the light conductor and is configured to attenuate the undesired signal portion.

In an embodiment of the present invention, an optical signal processing method is provided. The method includes modulating a first optical signal with information to produce a second optical signal. The second optical signal includes a first signal portion that is desired and a second signal portion that is not desired. The method also includes tuning a first optical pump signal to a Brillouin frequency that is less than, but corresponding to, a frequency of the second signal portion that is not desired. The method also includes receiving, at a light conductor, the second optical signal as a first input, and receiving, at the light conductor, the first optical pump signal as a second input. The method also includes inducing a Stimulated Brillouin Scattering effect in the light conductor utilizing the first optical pump signal, and attenuating the second signal portion that is not desired.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings:

FIG. 3 is an exemplary graph displaying a signal of interest in comparison to signals that are not of interest;

FIG. 4 illustrates an exemplary output where the signal of interest is amplified and the signals that are not of interest are attenuated in accordance with an aspect of the present invention;

FIG. 12 illustrates exemplary notch filtered results provided by an agile-tunable filter in accordance with an aspect of the present invention;

FIG. 13 illustrates additional exemplary notch filtered results provided by an agile-tunable filter in accordance with an aspect of the present invention;

DETAILED DESCRIPTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
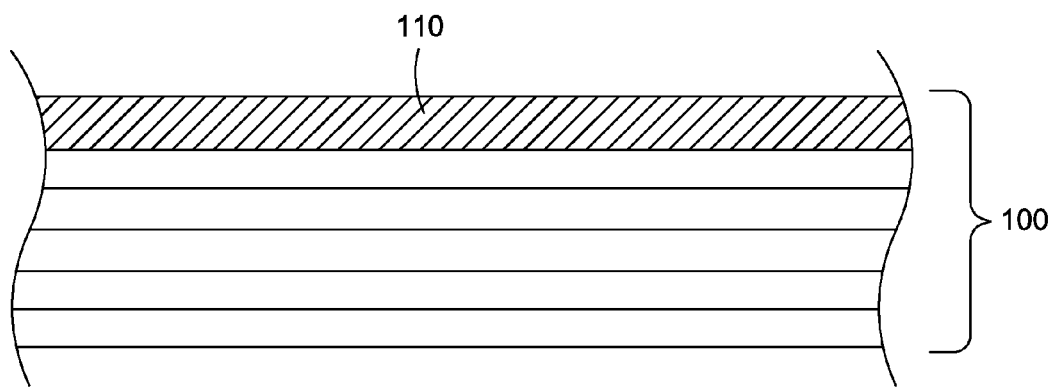
FIG. 1 represents an exemplary wideband RF bandwidth.

FIG. 1 illustrates a wideband RF spectrum 100 that may include frequencies ranging from a few Hertz or Kilohertz to upwards of many Gigahertz or many hundreds of Gigahertz. Within this broad spectrum is a potential signal of interest 110. Signal 110 may have a spectrum of 10 MHz.

Figure 2:
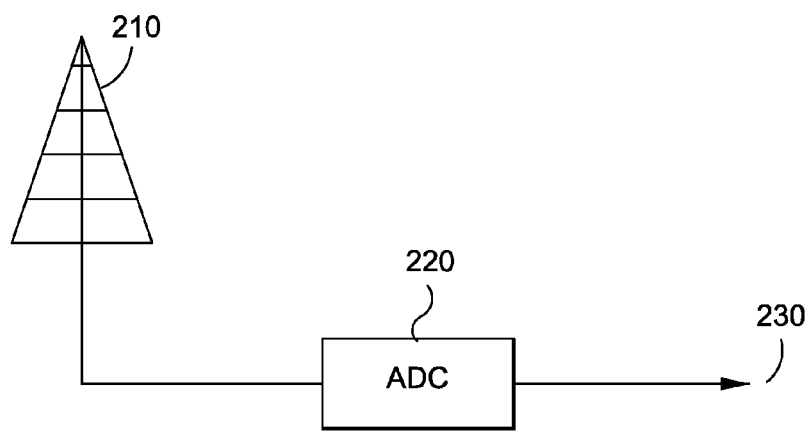
FIG. 2 is a schematic of an exemplary RF digitization technique.

FIG. 2 illustrates an exemplary process for digitization of a received RF signal. The figure includes antenna array 210, analog-to-digital converter (ADC) 220, and output signal 230. If antenna 210 were capable of receiving the entire bandwidth potentially illustrated in FIG. 1, ADC 220 would be unable to process the supplied spectrum of data. Additionally, if signal of interest 110 were received at the device shown in FIG. 2, the received signal would likely be distorted by interference such as from other communications, interferers, and jammers. Consequently, the output signal 230 is likely to be distorted.

FIG. 3 shows signal of interest 320 in relation to signals that are not of interest 310. As shown in the figure, signal 320 is of lesser amplitude than the signals 310. Given that existing RF amplifiers cannot narrowband amplify a spectrum below or at the mere tens of Megahertz, if signals 310 are within a few Megahertz of signal of interest 320, then amplification of signal 320 is likely to include amplified components of signals 310. Amplifying undesired components of signals 310 along with the signal 320 does nothing to improve the existing signal-to-noise ratio of desired signal 320, and might actually make the existing signal-to-noise ratio worse.

FIG. 4 illustrates an exemplary output where the signal of interest (desired signal) 420 is amplified and the signals that are not of interest (undesired signals) 410 are attenuated. Even in the case of signal 420 being within a frequency range of the tens of Megahertz of signal 410, only signal of interest 420 (and not signals 410) is amplified, and only signals 410 (and not signal 420) are attenuated. The amplification of signal 420 can be on the order of 30 dB or more, and the attenuation of signals 410 can be in the vicinity of 30 dB or more, such that the combined signal-to-noise ratio can be in the range of 60 dB or greater.

Some exemplary positive aspects of the present invention are shown in FIG. 4 and include amplification of desired signals, and attenuation of undesired signals (e.g., noise, cross-communications, interferers, and/or jammers). These results are achieved using Stimulated Brillouin Scattering (SBS). SBS may refer to the interaction of light with vibrational quanta in, or on, a light-conducting medium. The medium typically discussed herein may be, for example, silica, and specifically silica formed into a fiber optics line. The medium may be any light-conducting medium, however, such as glass in various forms and/or polymers of various types.

SBS may occur in a light conductor when a light wave of sufficient strength contacts the light-conducting media. The SBS process has a varying Brillouin threshold power based on different media types. The Brillouin threshold power in some aspects of the present invention is the point where the power of a light wave input becomes strong enough to spontaneously cause the SBS process within a given media without photonic seeding from the power of an additional light wave.

In other aspects, Brillouin threshold power may refer to: (1) the point where the input laser pump power equals a backscattered version of itself; (2) the point where a backscattered version of the laser input power equals a transmitted version of itself (i.e., where a backscattered version would be equal to the version that is actually transmitted in the conductor); (3) the point where a backscattered version begins to increase rapidly (or where the pump power begins to be depleted); (4) the input power at which a backscattered version of the pump wave at the light conductor is equal to 1% of the input pump wave; (5) the input power as measured at an output fails to increase despite increases in power at the input power signal generator; or (6) additional aspects that are known to those of skill in the art. An example of a laser pump input as referenced above is laser pump input 530 as shown in FIG. 5 and as further discussed herein.

Figure 5:
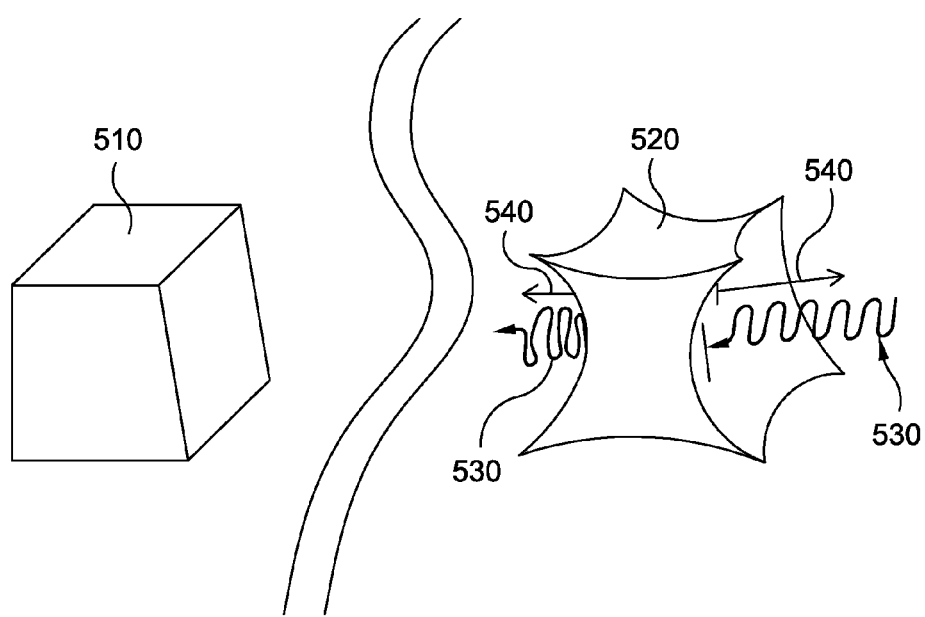
FIG. 5 is an exemplary conceptual diagram illustrating the electrostriction phenomenon that occurs during Stimulated Brillouin Scattering (SBS)

Part of the SBS process is illustrated by FIG. 5. The figure shows dielectric media blocks of light-conducting silica or silicon 510 and 520. Without external stimuli, block 510 rests in a natural state. Introducing light wave 530 into block 520 with enough pump power, however, causes block 520 to reach the SBS threshold, and induces an electrostriction effect. Electrostriction describes the state of the dielectric 520 that occurs due to the electromagnetic component that accompanies light wave 530. Because an electrical field is applied across the dielectric media when light wave 530 enters block 520, opposite sides of block 520 become differently charged and tend to attract each other. This attraction reduces the material thickness in the direction of the applied electrical field as is shown happening to block 520.

The electrostriction process produces an acoustic wave 540. The acoustic wave 540 predominantly travels backwards (i.e., opposite to the path of travel for the light wave 530) because the electrostriction effect causes an acoustic grating, but components of acoustic wave 540 travel both with and against light wave 530. The acoustic wave 540 includes Doppler shifted components at both higher and lower frequencies. When the pump power of signal 530 reaches the SBS threshold, a significant portion of light wave 530 is backscattered (the backscattered version of signal 530 is not shown in the diagram). This backscattered version of signal 530 is referred to as a "Stokes" wave. The backscattered version of light wave 530 interacts with the backwards-traveling-Doppler shifted acoustic wave 540. The result is a Doppler shifted, backscattered version of light wave 530 that has a different frequency than original light wave 530. The frequency difference due to the Doppler shift is on the order of tens of Megahertz, and in fiber optics lines may be approximately 35 Megahertz.

Figure 6:
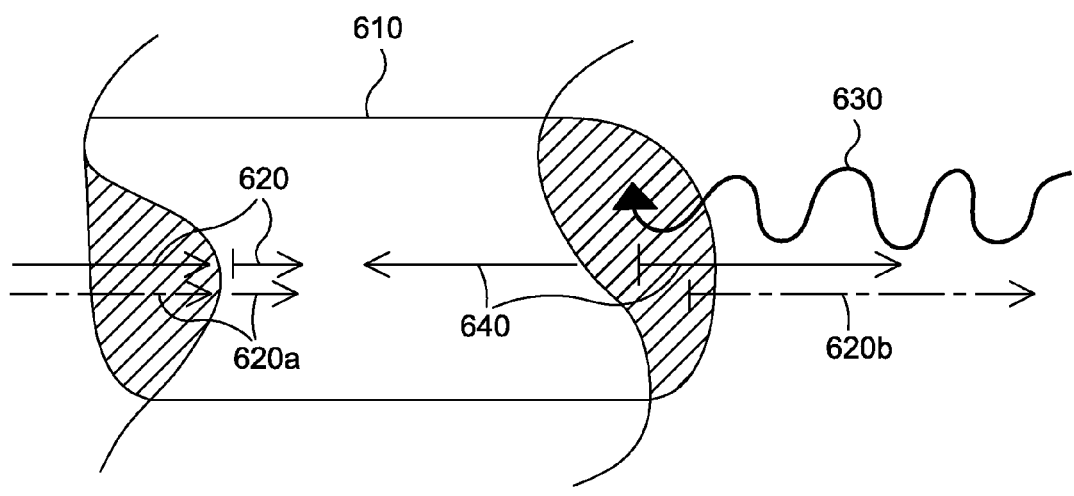
FIG. 6 illustrates an exemplary process of narrowband amplification of a photonic signal in accordance with an aspect of the present invention.

FIG. 6 is an illustration of a fiber optic line 610 undergoing a process of amplification in accordance with an aspect of the present invention. Light beam 620 is previously modulated to include the information transmitted by an RF signal. (A system showing modulation is described herein in relation to FIGS. 9 and 11.) Light beam 620 includes a weak sideband

620a. Weak sideband 620a provides seed photons for the SBS process. While it is possible to induce the SBS process (by reaching the Brillouin power threshold for the given media) with simply a large amount of laser pump power, it is an aspect of an embodiment of the present invention to induce the SBS process in a power efficient fashion without having to increase the laser pump power such that the laser pump power meets or exceeds the Brillouin threshold power. In certain embodiments of the present invention, laser pump power can be as little as a few-to-ten milliwatts.

Laser pump input 630 is input to the light conductor 610 at a Brillouin frequency higher than, but corresponding to, the frequency of weak sideband 620a. As noted above, laser pump input 630 provides an input to the fiber optic conductor 610 below the Brillouin power threshold while still inducing the SBS effect due to the photon seeding performed by weak sideband 620a. The power of pump input 630 can be on the order of 2-10 milliwatts. As shown in FIG. 6, the pump input 630 is introduced into the light conductor 610 in a direction opposite to the modulated light wave 620 and 620a. In various aspects of the present invention, the pump input 630 ought to be introduced into the light conductor 610 in a direction opposing the path of signal 620a to effect the amplification process. Additionally, in exemplary embodiments of the present invention, the terms "at, in, within, introduce, on, induce, cause, instigate" and words of the same or similar genres are used to describe the effect of pump input 630 in relation to light conductor 610 when the SBS process occurs. That is, the SBS effect occurs at, in and around light conductor 610 when the pump input 630 reaches a particular power. Therefore the terms used to describe signal 630 include the aforementioned terms (or words of the same/similar genres) as such relate to the light conductor 610 when the SBS effect is reached.

On contact with the light conductor 610, pump wave 630 induces an electrostriction effect such as that discussed in relation to FIG. 5. The electrostriction process produces acoustic wave 640. Acoustic wave 640 travels in both directions within light conductor 610, and the backwards reflected component of acoustic wave 640 causes pump wave 630 to be Doppler shifted. As noted previously, this shift is on the order of the tens of MHz and may be in the vicinity of 35 MHz.

Because the frequency of pump input 630 is higher than, but aligned with, the Brillouin frequency of the weak sideband 620a, sideband 620a is efficiently amplified. This is due to sideband seed signal 620a interacting with the input pump 630 such that the acoustic grating effect on acoustic wave 640 is enhanced. The back-reflected portion of acoustic wave 640 therefore has an enhanced effect in Doppler shifting the backscattered version of pump input 630 (the backscattered version of 630 is not shown in FIG. 6).

The above interactions efficiently feed the Doppler shifted, backscattered version of pump laser 630 into the sideband signal 620a resulting in an efficiently amplified output signal 620b. The amplification can be in the vicinity or greater than 30 dB and will include the information previously taken from the received RF signal and imparted to light wave 620.

Figure 7:
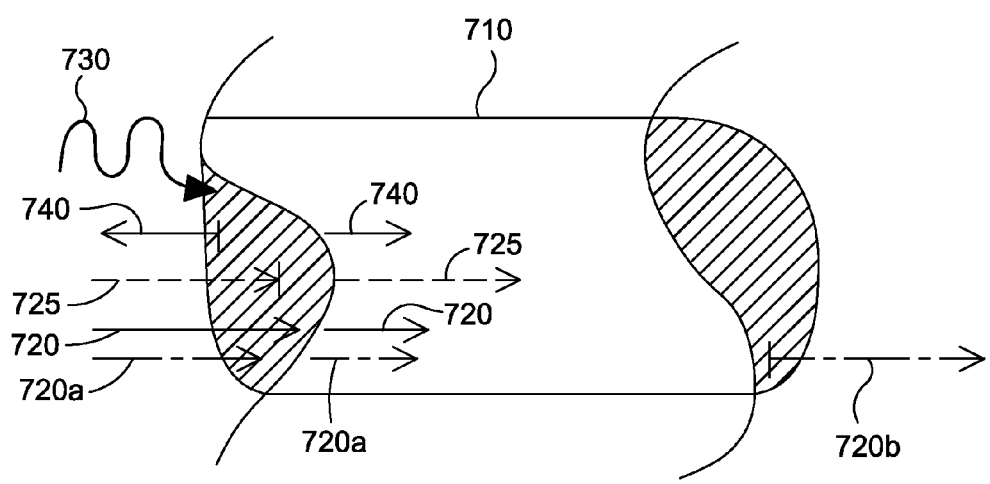
FIG. 7 illustrates an exemplary filtering process for an agile-tunable narrowband notch filter in accordance with an aspect of the present invention.

FIG. 7 is an illustration of a fiber optic line 710 undergoing a process of notch filtering in accordance with an aspect of the present invention. Light beam 720 is previously modulated to include the information transmitted by an RF signal. The process of modulation is described herein in relation to FIGS. 9 and 11. Light beam 720 includes a weak sideband 720a. Transmitted alongside signals 720 and 720a are undesired signals 725. The signals 725 represent undesired communications, cross-talk, interferers, and/or jammers along the lines as the undesired signals 310 and 410 previously discussed in relation to FIGS. 3 and 4.

In contrast to FIG. 6, weak sideband 720a may still provide seed photons for the SBS process for amplification, but undesired signals 725 provide seed photons for a further SBS process used to notch filter/attenuate the undesired signals. As previously stated, it is an aspect of an embodiment of the present invention to induce the SBS process in a power efficient fashion without having to increase the laser pump power such that the laser pump power exceeds the Brillouin threshold power. In certain embodiments of the present invention, laser pump power for either or both of the amplification or filtering processes can be as little as a few-to-ten milliwatts.

Laser pump input 730 is input to light conductor 710 on either the same side that signal 720 enters light conductor 710 or on the opposite side that signal 720 enters light conductor 710. For the sake of simplicity FIG. 7 shows the pump input entering the same side as signal 720/725. The laser pump input 730 is tuned to a Brillouin frequency lower than, but corresponding to, the frequency of undesired signals 725. The frequency of the undesired signals can be determined by performing a simple frequency scan on an output signal and noting what frequencies are not desired, as one skilled in the art readily comprehends.

As noted above, laser pump input 730 can be input to the fiber optic conductor 710 below the SBS threshold while still inducing the SBS effect due to the photon seeding performed by undesired signals 725. Again, the power of pump input 730 can be on the order of 2-10 milliwatts. FIG. 7 shows the pump input 730 being introduced into light conductor 710 in the same direction as modulated light wave 720 and sideband 720a. On contact with the light conductor 710, pump wave 730 induces an electrostriction effect such as that discussed in relation to FIGS. 5 and 6. The electrostriction process produces acoustic wave 740. Acoustic wave 740 travels in both directions within light conductor 710, and the backwards reflected component of acoustic wave 740 causes pump wave 730 to be Doppler shifted. As noted previously, this shift is on the order of tens of MHz and may be in the vicinity of 35 MHz.

Because the frequency of pump input 730 is tuned to a Brillouin frequency lower than, but corresponding to, the frequency of undesired signals 725, the undesired signals 725 are effectively notch filtered/attenuated. This is due to undesired signals 725 interacting with the input pump 730 such that the grating effect (previously mentioned in relation to FIGS. 5 and 6) on acoustic signal 740 is significantly enhanced. The backwards traveling acoustic wave then has a greater impact on the pump input signal 730, causing the backscattered version of signal 730 to efficiently attenuate unwanted signals 725 such that their amplitude is reduced. The attenuation can be in the vicinity or greater than 30 dB in narrow wavelengths, for example just a few tenths of a nanometer.

Figure 8:
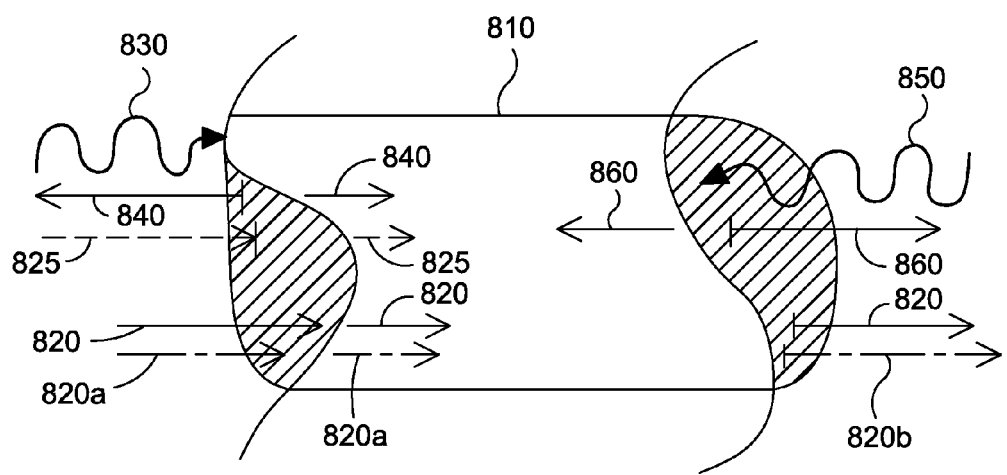
FIG. 8 illustrates an exemplary process of both narrowband amplification and agile-tunable notch filtering in accordance with aspects of the present invention.

FIG. 8 is an illustration of fiber optic line 810 undergoing the processes of both amplification and filtering/attenuation in accordance with aspects of the present invention. Light beam 820 is previously modulated to include the information transmitted by an RF signal. The process of modulation is described herein in relation to FIGS. 9 and 11. Light beam 820 includes a weak sideband 820a. Weak sideband 820a provides seed photons for the SBS process. Laser pump input 830 is input to the light conductor 810 at a Brillouin frequency higher than, but corresponding to, the frequency of weak sideband 820a. As noted above, laser pump input 830 can be input to the fiber optic conductor 810 below the SBS threshold while still inducing the SBS effect due to the photon seeding performed by weak sideband 820a. Again, the power of pump input 830 can be on the order of 2-10 milliwatts.

As shown in FIG. 8, the pump input 850 is introduced into light conductor 810 in a direction opposite to the modulated light wave 820 and 820a. On contact with the light conductor 810, pump wave 850 induces an electrostriction effect such as that discussed in relation to FIGS. 5-7. The electrostriction process produces acoustic wave 840. Acoustic wave 860 travels in both directions within light conductor 810, and the backwards reflected component of acoustic wave 860 causes pump wave 850 to be Doppler shifted. As noted previously, this shift is on the order of tens of MHz and may be in the vicinity of 35 MHz.

Because the pump input 850 is tuned to a Brillouin frequency higher than, but corresponding to, the frequency of weak sideband 820a, sideband 820a is efficiently amplified. Sideband seed signal 820a interacts with the input pump 850 and acoustic wave 860 such that the backscattered version of input pump signal 850 is significantly enhanced, feeding sideband signal 820a with the backscattered version of signal 850, resulting in an efficiently amplified output signal 820b. The amplification can be in the vicinity or greater than 30 dB and will include the information previously taken from the received RF signal and imbedded within the modulated light wave 820.

Transmitted alongside signals 820 and 820a are undesired signals 825. The signals 825 represent undesired communications, cross-talk, interferers, and/or jammers along the lines as the undesired signals 310 and 410 previously discussed in relation to FIGS. 3 and 4.

Undesired signals 825 provide seed photons for an SBS process used to notch filter/attenuate the undesired signals. Laser pump input 830 is introduced to light conductor 810 on either side of light conductor 810 in relation to the entry point for modulated light 820. The laser pump input 830 is tuned to a Brillouin frequency lower than, but corresponding to, the frequency of undesired signals 825. The frequency of the undesired signals can be determined by performing a simple frequency scan on an output signal and noting what frequencies are not desired.

Laser pump input 830 can be introduced to the fiber optic conductor 810 below the SBS threshold while still inducing the SBS effect due to the photon seeding performed by undesired signals 825. The power of pump input 830 can be on the order of 2-10 milliwatts. FIG. 8 shows the pump input 830 being introduced into light conductor 810 in the same direction as modulated light wave 820 and sideband 820a (but as noted previously the input 830 can be introduced at either end of light conductor 810). On contact with the light conductor 810, pump wave 830 induces an electrostriction effect such as that discussed in relation to FIG. 5. The electrostriction process produces acoustic wave 840. Acoustic wave 840 travels in both directions within light conductor 810, and the backwards reflected component of acoustic wave 840 causes pump wave 830 to be Doppler shifted. As noted previously, this shift is on the order of the tens of MHz and may be in the vicinity of 35 MHz.

Because the frequency of pump input 850 is tuned to a Brillouin frequency less than, but corresponding to, the frequency of the undesired signals 825, the undesired signals 825 are effectively notch filtered/attenuated. This is due to undesired signals 825 interacting with the input pump 850 such that the grating effect (previously mentioned in relation to FIGS. 5, 6 and 7) on acoustic signal 840 is significantly enhanced. The backwards traveling acoustic wave then has a greater impact on the pump input signal 830, causing the backscattered version of signal 830 to efficiently attenuate unwanted signals 825 such that their amplitude is reduced. The attenuation can be in the vicinity or greater than 30 dB in narrow wavelengths of just a few tenths of a nanometer, for example.

Referring back to FIG. 4 illustrates exemplary results of the amplified and attenuated signal process of an aspect of the present invention, such as the process that is illustrated in FIG. 8 and as described above. In this process as achieved through aspects of the present invention, the unwanted signals (such as signals 410 in FIG. 4) have been attenuated, and the desired signal (such as 420 in FIG. 4) has been amplified.

Figure 9:
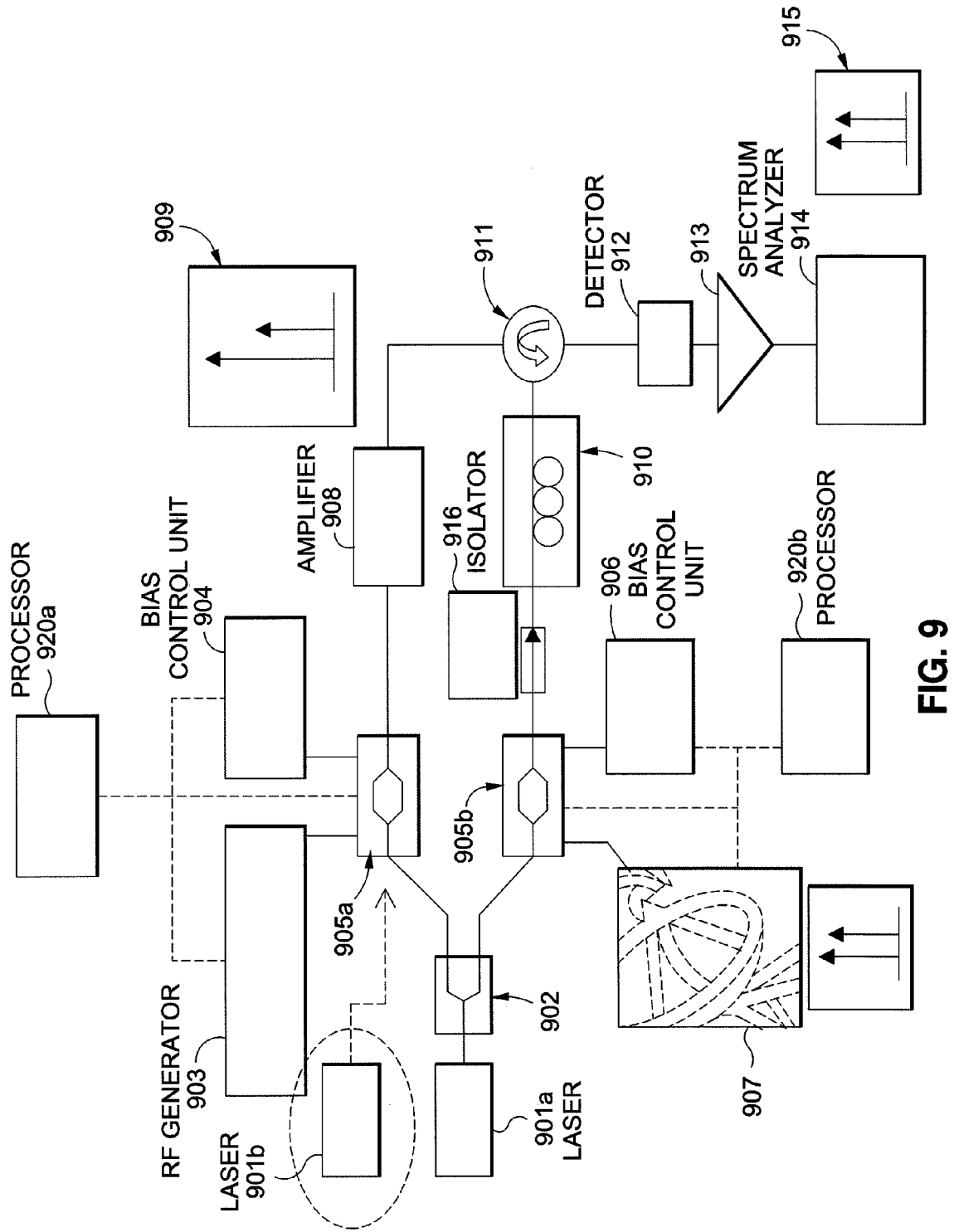
FIG. 9 is a schematic of an exemplary system in accordance with various aspects of the present invention.

FIG. 9 is a schematic showing various exemplary components useful to implement a system to amplify and/or filter a selected signal in accordance with aspects of the present invention. For purposes of brevity, an exemplary amplification process is described in relation to the figure, but an exemplary attenuation or filter process could also be implemented using the exemplary components, for instance the exemplary attenuation/filter process discussed above in relation to FIG. 7. If a filter/attenuation process were being implemented, the direction of the pump signal being used to create the SBS effect for attenuation could be introduced into the light conductor from either the same side, or the side opposite, to the direction of the signal for which notch filtering/attenuation was desired.

In FIG. 9, laser 901a provides a source laser that is sent to splitter 902. Splitter 902 splits the laser into two alternate paths, one path to modulator 905a and one path to modulator 905b. Laser 901a can be any suitable type of laser. In a slightly different arrangement, two or more lasers could be used. For instance, a first laser 901a could be used to provide one input directly to element 905b, and a second laser 901b could be used to provide another input directly to element 905a. Modulators 905a-b can be Mach-Zehnder modulators or any other modulator that can be used to impart information to an optical signal. In another arrangement the lasers 901a and/or 901b could be included as a component of modulators 905b and 905a, respectively, creating one laser/modulator unit for individual laser paths.

Modulator 905a is provided with inputs from RF generator 903 and bias control unit 904. All or some of modulator 905a, RF generator 903, and bias control unit 904 could be configured in one aspect of an embodiment of the invention to operate with an input from processor 920a. Processor 920b could be used in an aspect of an embodiment of the invention to operate modulator 905b and/or bias control unit 906, and/or to tune the reception of antenna 907. Similarly, processors 1111a, 1111b, and 1111c (shown in FIG. 11) could be used in aspects of various embodiments of the invention to control their respective RF generators, bias control units, and/or antenna. Additionally, one of skill in the art would understand that a modulator, RF generator, and bias control unit could be used to create a single side band-suppressed carrier to modulate the optical signal at the modulator.

The inputs to modulator 905a are used to tune the laser to a known frequency, such as the frequency of signal 720a as shown in FIG. 7 and as discussed above in relation to tuning the pump wave to the weak sideband seed signal. Modulator 905a provides a tuned laser output to amplifier 908. While amplifier 908 is shown as an Erbium-Doped Filter Amplifier, it could be any conventional laser amplifier and in some embodiments of the present invention, the output of modulator 905a is sufficient such that an amplifier as shown as element 908 could be skipped altogether.

Element 909 represents the laser pump input to a light conductor such as the fiber coil 910 through circulator 911 received from modulator 905a. Pump signal 909 is similar in nature and character to the pump input discussed in relation to FIG. 6 as element 630 and/or as the pump input discussed in relation to FIG. 8 as element 850.

A modulated RF signal may be received at antenna 907 and may then be transmitted to modulator 905b. Also input to modulator 905b is bias control unit 906. Modulator 905b is a Mach-Zehnder modulator, but it may be any optical modulator. Modulator 905b outputs a light wave imparted with the information of the modulated RF signal received from antenna 907. The light wave output first traverses an isolator 916 that may be used to isolate the modulator 905b from light conductor 910. That is, the isolator 916 may be used in some aspects of an embodiment of the invention to prevent back-scattered or back-fed light from leaving the light conductor 910 and entering the modulator 905b.

Isolator 916 allows the a light-modulated signal to enter fiber coil 910. One aspect of an embodiment of the present invention is that fiber coil 910 should be relatively long in length to allow for the SBS process to occur with a relatively low pump signal input power. It is at fiber coil 910 that the Brillouin amplification process as described in relation to FIG. 6 occurs. For the sake of brevity that process will not be reiterated except to note that the process described in relation to FIG. 6 involves a length of fiber coil on the order of about 12 kilometers, such as that shown in FIG. 9. It has been found that the physical dimensions of a 15 kilometer length of fiber coil can be reduced to a diameter of about six inches with a depth of about 1 inch using various fiber optic manufacturing techniques. Additional fiber coil lengths could be used, however, including shorter lengths or longer lengths. The shorter the fiber coil, the greater the pump power needed to instigate the SBS process. Conversely, a longer length of fiber coil requires a smaller amount of pump power to instigate the SBS process.

The previously noted pump power of a few to approximately 10 milliwatts is achieved with a fiber coil length approximating 12 kilometers. Certain embodiments of the present invention may be unconcerned with the required pump power, however, and in such cases the fiber coil length may be reduced to approximately 1 kilometer or even approximately less than ½ of a kilometer.

Using the amplification process as described in relation to FIG. 6, the fiber coil 910 outputs a Brillouin amplified signal containing the information originally received at antenna 907 as modulated RF. The amplified signal may be detected at detector 912 where it would be detected for frequency and amplitude and then may be analyzed by spectrum analyzer 914. Spectrum analyzer 914 could instead be an ADC or other output device to reflect various aspects of the instant invention. The final output of the system shown in FIG. 9 is element 915 as an amplified signal containing desired information.

Figure 10:
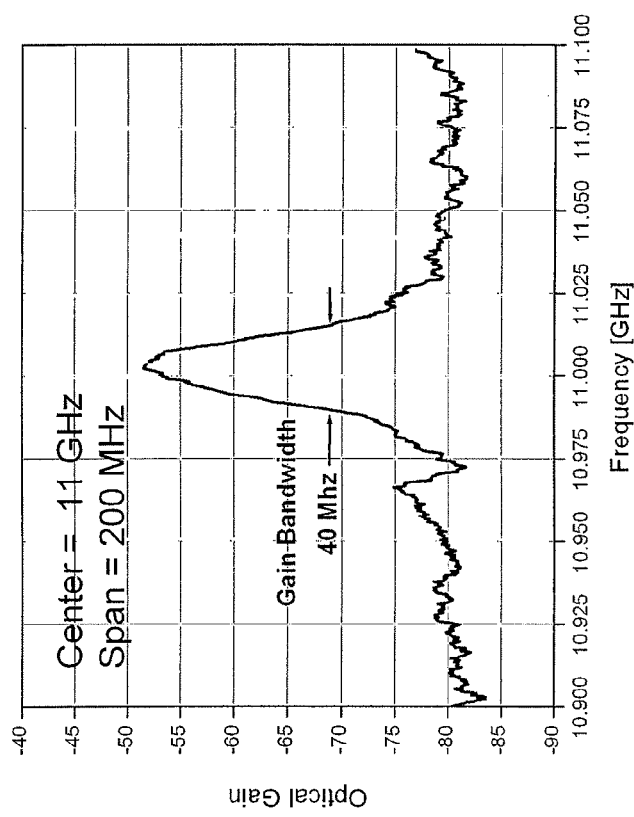
FIG. 10 is a graph of exemplary gain and bandwidth results provided by amplification of a photonic signal in accordance with an aspect of the present invention.

FIG. 10 shows output signal 915 as possessing a gain bandwidth of 40 MHz with a center of 11 GHz, a span of 200 MHz, and an amplitude gain of 25 dB. The gain bandwidth is 10 MHz at negative 3 dB and 40 MHz at negative 20 dB. Other parameters include an NA output power of 10 dB, a pump power of 11 mW, and a fiber coil length of 15 km.

Figure 11:
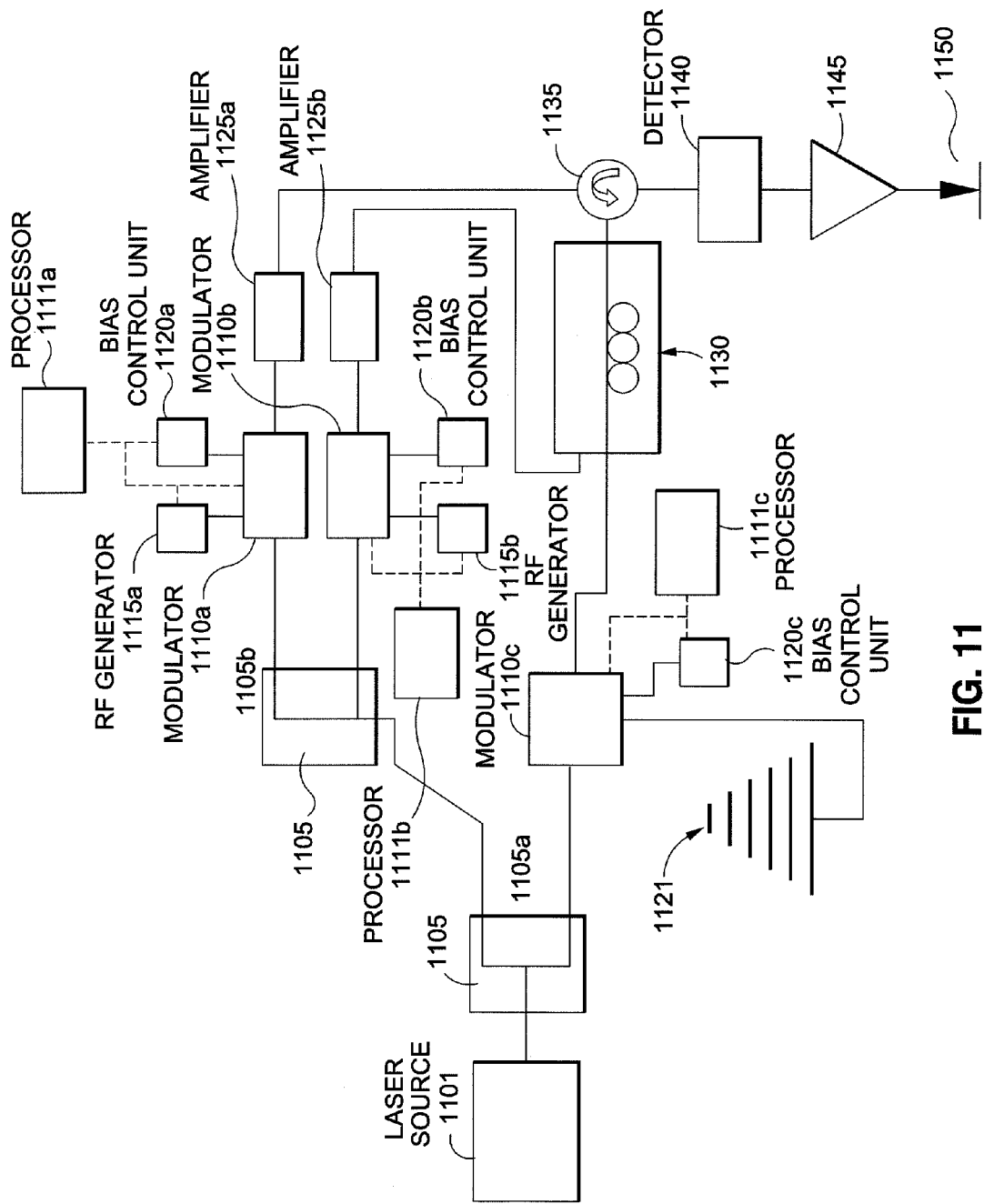
FIG. 11 is a schematic of an exemplary system that provides both narrowband amplification and agile-tunable notch filtering of a photonic signal in accordance with various aspects of the present invention.

FIG. 11 is a schematic showing various components useful to implement aspects of the present invention including both amplification of a desired signal and attenuation of undesired signals. Laser source 1101 generates an un-modulated laser that is provided to splitter 1105a. Splitter 1105a splits the laser into two separate beams, sending one to splitter 1105b and the other to modulator 1110c.

Modulator 1110c is provided with two inputs, the first being a modulated RF signal from antenna 1121 and the second being bias control from bias control unit 1120c. The modulator 1110c may be any known light modulator but the example given is the Mach-Zehnder type. The modulator 1110c takes the information received from the RF signal and modulates the laser light with that information before sending the modulated light wave to fiber coil 1130. While the figure shows only one fiber coil 1130, in various aspects of the present invention more than one fiber coil 1130 could be used. For instance, a first fiber coil could be used purely for amplification and a second fiber coil could be used purely for attenuation/filtering.

The other output from splitter 1105a is sent to splitter 1105b, where the laser light is once more split into two separate light waves. These separate light waves are sent to modulators 1110a and 1110b, where the laser light is tuned to an RF frequency provided by RF generators 1115a and 1115b. The modulators 1110a and b may be any known modulator, but those shown in FIG. 11 are Mach-Zehnder modulators.

The light waves are bias controlled by inputs received from bias control units 1120a and 1120b, respectively. The light wave at modulator 1110a is used for the pump input employed for amplification of a desired signal such as is described in relation to element 630 in FIG. 6 and/or in relation to element 850 in FIG. 8. The light wave output from modulator 1110b is used for the pump input employed for attenuation of undesired signals such as is described in relation to element 730 in FIG. 7. As noted previously in relation to FIGS. 7 and 8, the output of modulator 1110b could be introduced to fiber coil 1130 at either end. Further, either of the signals provided at the output of modulators 1110a or 1110b may be amplified by amplifiers 1125a or b, but in various aspects of the present invention amplification at that point is not a requirement.

The pump output from modulator 1110a is tuned to a Brillouin frequency higher than, but corresponding to, the frequency of a weak sideband of the modulated light signal provided to fiber coil 1130 from modulator 1110c. The process of how the sideband is amplified using the SBS process is previously described in relation to FIG. 6 and will not be reiterated for the sake of brevity. The process described in FIG. 6 can be applied to the fiber coil 1130, thereby providing an amplified version of a desired light wave containing the information originally received in RF form at antenna 1121.

Referring back to RF generator 1115b, those skilled in the art would know that the RF generator can be tuned to any desired frequency. In evaluating an output of the overall system, undesired noise, interferers, and/or jammers may be noted. The RF generator 1115b can be tuned to those undesired frequencies and the output of modulator 1110b can then be input to fiber coil 1130 and used to notch filter/attenuate the undesired signals in the same (or similar) process as was described in relation to element 730 in FIG. 7. For brevity's sake that process is not reiterated.

The desired effects on the signal output from the fiber coil 1130 is thus an amplification of the desired signal with a simultaneous attenuation/notch filtering of undesired signals. Again, as previously noted, fiber coil 1130 may be of a substantial length to allow for a lower pump input power. The fiber coil 1130 shown in FIG. 11 is approximately 12 km in length an occupies a space of less than 6 inches in diameter and with approximately less than an inch of depth. Fiber coil 1130 provides an output through circulator 1135 to detector 1140 where the signal is detected for frequency and amplitude. The output signal is then amplified at component 1145 (again, this feature is not a necessary aspect of the present invention) and output as amplified/filtered signal 1150.

FIGS. 12 and 13 illustrate the agility of the notch filter/attenuator aspects of the present invention. As shown in FIG. 12, a lower sideband has been filtered with a notch filter aspect of the present invention on a carrier at 9 GHz (at 15 dB) with a signal processing pump frequency of 19.861 GHz (at 20 dB). The result shows a lower sideband that has been attenuated by 12 dB. As shown in FIG. 13, the carrier itself (at 9 GHz at 15 dB) has been notch filtered with a filter aspect of the present invention where the signal processing pump is operative at 10.87 GHz at 20 dB, resulting in an attenuated carrier of 10 dB less in amplitude. By way of example, the notch filter aspect as discussed herein may be selectively tuned by changing the frequency of the RF generators described in relation to element 1110b in FIG. 11.

Aspects of the instant invention provide for a tunable, narrowband Stimulated Brillouin Scattering (SBS) gain-based microwave filter. The tunable range of the filter may be from anywhere above zero Hertz to 20 GHz, with a small signal gain that may be in the range of 20-30 dB, a tunable bandwidth that may be in the range of 10 Hertz to 400 MHz, and that may include pass, notch, and pass-notch filter capacity.

An aspect of an embodiment of the invention utilizes an SBS process to selectively perform narrowband amplification and/or notching in the optical domain. With the correct configuration of components the optical gain/filter can operate on RF signals. In an embodiment, a wideband mach zehnder modulator is used to impress RF information collected from an antenna onto an optical carrier. (Antenna bandwidths can be sufficiently large so that direct digitization of the RF information is not capable with existing ADC technology.) An embodiment of the invention may selectively process a narrowband RF information signal anywhere within a wide tuning bandwidth. Aspects of embodiments include individually and selectively adjustable gain and notch filters.

In particular, aspects of embodiments impart RF information onto an optical carrier with a modulator. Sidebands of the optical carrier then contain the information. When the sidebands are sufficiently weak they may act as seed photons for the SBS process. A separate pump laser may be fed into the same fiber but traveling in the opposite direction as the modulated sideband. If the pump wavelength is tuned to the Brillouin frequency that coincides with the modulated sideband, then efficient amplification of the sideband can result. In other aspects of the same or other embodiments, if a second pump wave at another frequency also corresponding to the Brillouin frequency (but in this case on the side of the increased doppler frequency) then efficient attenuation of the modulated sideband may occur. Selectively providing gain or attenuation to various modulated sidebands may be done by altering the frequency and/or amplitude of the pump wave(s), as one skilled in the art would understand.

Figure 14:
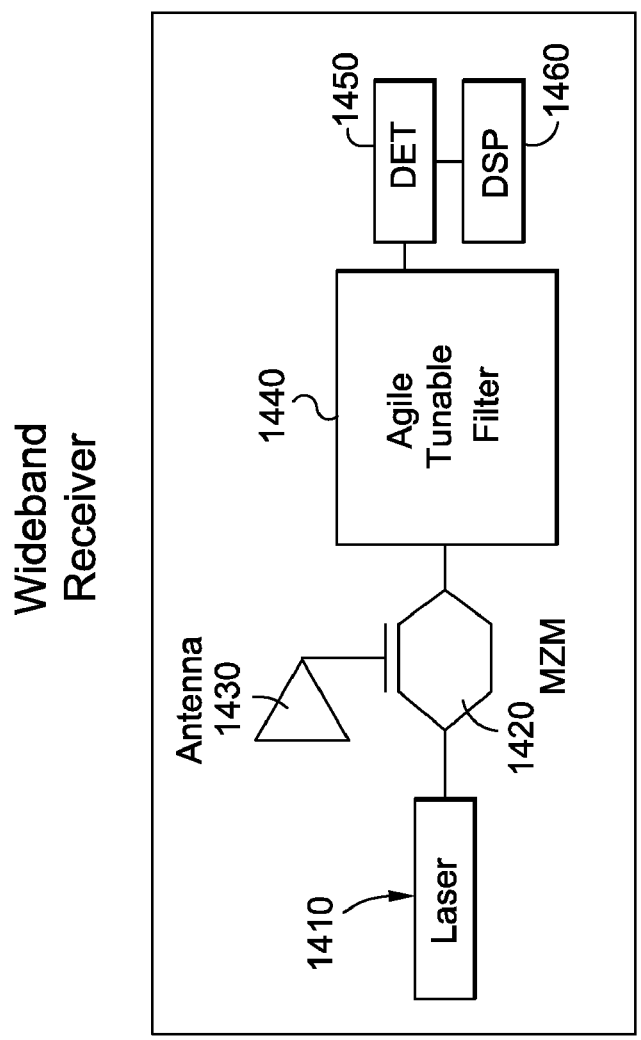
FIG. 14 illustrates an exemplary wideband receiver in accordance with an aspect of the present invention.

FIG. 14 illustrates a wideband receiver system using the filter aspect of the present invention. As illustrated, an laser 1410 provides a non-modulated optical input to modulator 1420. Modulator 1420 takes the RF signal from antenna 1430 and imparts information taken from the RF signal into the light beam received from laser 1410. A modulated light beam output is then provided to an agile tunable filter 1440 in accordance with the present invention, for instance, the filter shown in FIGS. 7, 8 and/or 11 (and as discussed above in relation to each). The agile tunable filter 1440 provides a filtered output to detector 1450 and then to a digital signal processor 1460. The output of agile tunable filter may be otherwise sent to components different than 1450 and/or 1460, as skilled artisans readily comprehend. For instance, the output of filter 1440 may be provided to a digital-to-analog converter and then to a cathode ray tube or other display device, or the output of filter 1440 may be detected for digitization and then used as an input to a digital device.

Figure 15:
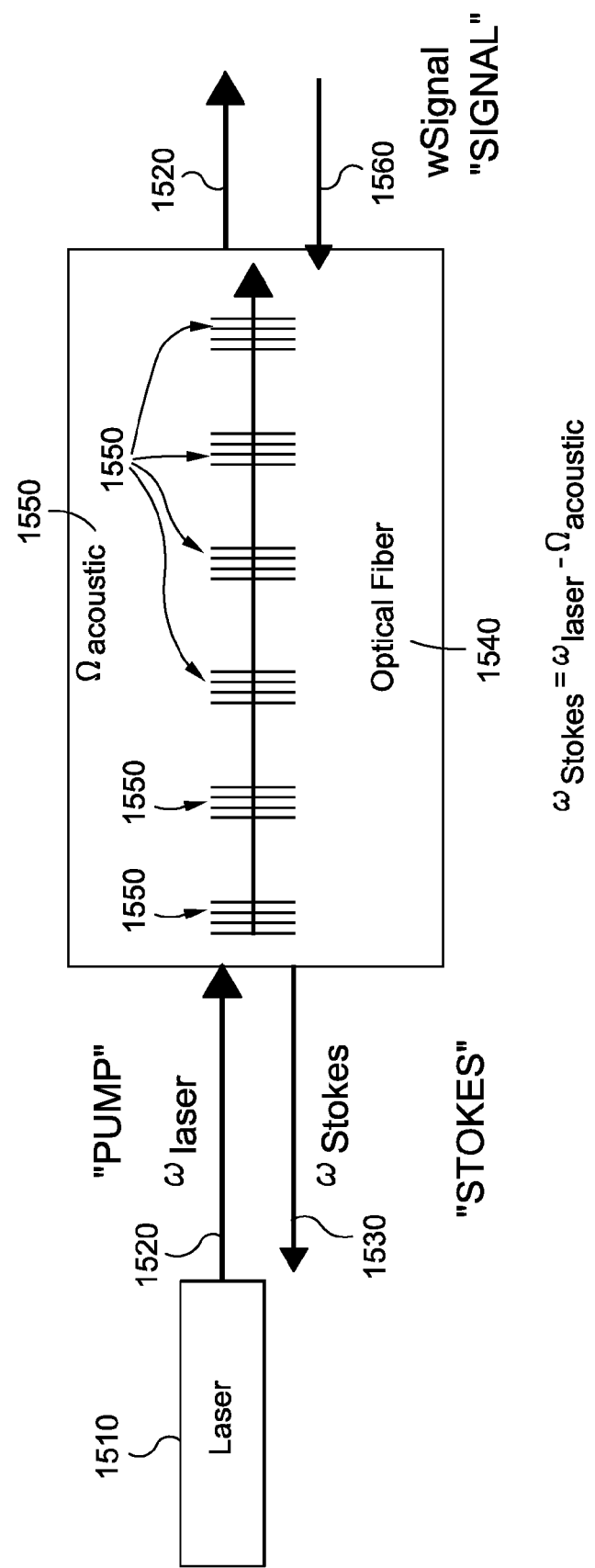
FIG. 15 illustrates an exemplary narrowband photonic filter in accordance with an aspect of the present invention.

FIG. 15 illustrates the interaction of: a pump signal 1520, an input signal 1560, and an acoustic wave 1550 within a light conducting medium such as optical fiber 1540. The acoustic wave 1550 is generated by introducing pump beam 1520 into fiber 1540. Power is exchanged between the pump signal 1520 and Stokes signal 1530 via acoustic wave 1550. Attenuation of weak signal 1560 occurs when the frequency the stokes wave is less than the frequency of the weak signal. Amplification of weak signal 1560 occurs when the frequency of the stokes wave 1530 is similar or greater than the frequency of the weak signal 1560. Generally, the power of the stokes wave 1530 is equal to the power of the laser pump input 1520 minus the power of the acoustic wave 1550. In some aspects of the present invention the line width for amplification or attenuation is on the order of 10 MHz.

It is possible to implement some aspects of the present invention as a method and/or in a computer system. The computer system may include a bus or other communication mechanism for communicating information, and a processor coupled with the bus for processing information. The computer system may also include a memory coupled to the bus for storing information and instructions to be executed by the processor. The memory may also be used for storing temporary variables or other intermediate information during execution of instructions by the processor. The computer system further may also include a data storage device, such as a magnetic disk or optical disk, coupled to the bus for storing information and instructions. The computer system may be coupled to a display device for displaying information to a user. An input device, such as, for example, a keyboard or a mouse may also be coupled to the computer system for communicating information and command selections to the processor.

According to some embodiments of the present invention, signal amplification and/or filtering may be performed utilizing a computer system (for example, by varying or selecting a pump signal power and/or frequency in response to an output of a processor executing one or more sequences of one or more instructions contained in a memory). Such instructions may be read into the memory from a machine-readable medium, such as a data storage device.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

It is understood that the specific order or hierarchy or steps in the processes disclosed herein is an illustration of exemplary approaches. Based upon design preferences, it is understood that the specific order or hierarchy of steps in the process may be re-arranged. Some of the steps may be performed simultaneously. The accompanying method claims present elements of the various in a sample order and are not meant to be limited to the specific order or hierarchy presented.

A reference to an element in the singular is not intended to mean "one and only one" unless specifically stated, but rather "one or more." The term "information" derived from a radio frequency signal may include data (e.g., audio, video, multimedia, instructions, commands, or other information). The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. An optical signal processing system, comprising:
    a first light modulator configured to receive a first optical signal, the first light modulator configured to place information on the first optical signal, and the first light modulator configured to produce, from at least the first optical signal and the information, a second optical signal comprising a first signal portion that is desired (a "desired signal portion") and a second signal portion that is not desired (an "undesired signal portion");
    a second light modulator configured to tune a first optical pump signal to a Brillouin frequency that is less than, but corresponding to, a frequency of the undesired signal portion;
    a light conductor configured to receive as a first input the second optical signal and as a second input the first optical pump signal tuned to the Brillouin frequency, wherein the optical signal processing system is configured to cause the first optical pump signal tuned to the Brillouin frequency to induce a Stimulated Brillouin Scattering effect at the light conductor and is configured to attenuate the undesired signal portion;
    a splitter configured to receive the first optical signal and to send the first optical signal to the first light modulator and to the second light modulator;
    an isolator configured to receive the second optical signal, to send the second optical signal to the light conductor, and to isolate the light conductor from the first light modulator;
    a first radio frequency generator configured to generate a first radio frequency signal; and
    a first bias control unit configured to generate a first bias control signal, wherein the second light modulator is configured to receive the first radio frequency signal, the first bias control signal, and the first optical signal, and to produce the first optical pump signal.

2. The optical signal processing system of claim 1, further comprising:
    a third light modulator configured to tune a second optical pump signal to a second Brillouin frequency that is more than, but corresponding to, a frequency of the desired signal portion,
    wherein the light conductor is further configured to receive the second optical pump signal tuned to the second Brillouin frequency, and
    wherein the optical signal processing system is configured to cause the second optical pump signal tuned to the second Brillouin frequency to induce a Stimulated Brillouin Scattering effect in the light conductor and is configured to amplify the desired signal portion.

3. The optical signal processing system of claim 1, wherein the information is derived from a second radio frequency signal.

4. The optical signal processing system of claim 1, wherein the light conductor is of a length between ½ of a kilometer and 30 kilometers.

5. The optical signal processing system of claim 1, further comprising:
    a processor,
    wherein the second light modulator is configured to selectively tune the first optical pump signal based on an input received from the processor.

6. The optical signal processing system of claim 2, further comprising:
    a processor,
    wherein the third light modulator is configured to selectively tune the second optical pump signal based on an input from the processor.

7. The optical signal processing system of claim 1, wherein a power level of the first optical pump signal is less than a Brillouin threshold power.

8. The optical signal processing system of claim 2, wherein a power level of the second optical pump signal is less than a Brillouin threshold power.

9. The optical signal processing system of claim 1, wherein the optical signal processing system is configured to attenuate the undesired signal portion within a frequency bandwidth of tens of MHz or less.

10. The optical signal processing system of claim 2, wherein the optical signal processing system is configured to amplify the desired signal portion within a frequency bandwidth of tens of MHz or less.

11. The optical signal processing system of claim 1, further comprising an antenna, wherein the first light modulator is configured to receive a radio frequency input from the antenna.

12. The optical signal processing system of claim 1, further comprising:
    a first amplifier configured to receive the first optical pump signal from the second modulator and to amplify the first optical pump signal;
    a circulator configured to receive the first optical pump signal from the first amplifier, to route the first optical pump signal to the light conductor, and to route an output of the light conductor to a detector; and
    a detector configured to receive the output of the light conductor and to detect information in the output of the light conductor.

13. The optical signal processing system of claim 1, further comprising:
    a second radio frequency generator configured to generate a second radio frequency;
    a second bias control unit configured to generate a second bias control signal;
    a third light modulator configured to receive the second radio frequency, the second bias control signal, and the first optical signal, and to create a second optical pump signal from the second radio frequency, the second bias control signal, and the first optical signal,
    wherein the light conductor is configured to receive the second optical pump signal.

14. The optical signal processing system of claim 1, wherein the light conductor comprises an end and an opposing end, the end of the light conductor configured to receive the first input, and one of the end and the opposing end of the light conductor configured to receive the second input.

15. The optical system of claim 2, wherein the light conductor comprises an end and an opposing end, the end of the light conductor configured to receive the first input; and the opposing end of the light conductor configured to receive the second input.

16. The optical signal processing system of claim 1, wherein
- the second light modulator is configured to tune a second optical pump signal to a second Brillouin frequency that is more than, but corresponding to, a frequency of the desired signal portion,
- the light conductor is configured to receive the second optical pump signal tuned to the second Brillouin frequency and the second optical signal, and
- the optical signal processing system is configured to cause the second optical pump signal to induce a Stimulated Brillouin Scattering effect at the light conductor and is configured to amplify the desired signal portion.

17. An optical signal processing method, comprising:
- sending, by a splitter, a first optical signal to a first light modulator and to a second light modulator;
- modulating, by the first light modulator, the first optical signal with information to produce a second optical signal, the second optical signal comprising a first signal portion that is desired and a second signal portion that is not desired;
- generating, by a first radio frequency generator, a first radio frequency signal;
- generating, by a first bias control unit, a first bias control signal;
- receiving, by the second light modulator, the first radio frequency signal, the first bias control signal, and the first optical signal;
- producing, by the second light modulator, a first optical pump signal based on the first radio frequency signal, the first bias control signal, and the first optical signal;
- tuning, by the second light modulator, the first optical pump signal to a Brillouin frequency that is less than, but corresponding to, a frequency of the second signal portion that is not desired;
- isolating, by an isolator, a light conductor from the first light modulator;
- receiving, at the light conductor, the second optical signal as a first input;
- receiving, at the light conductor, the first optical pump signal as a second input;
- inducing a Stimulated Brillouin Scattering effect in the light conductor utilizing the first optical pump signal; and
- attenuating the second signal portion that is not desired.

18. The optical signal processing method of claim 17, further comprising:
- tuning a second optical pump signal to a Brillouin frequency that is more than, but corresponding to, a frequency of the first signal portion that is desired;
- receiving, at the light conductor, the second optical pump signal as a third input;
- inducing a Stimulated Brillouin Scattering effect in the light conductor utilizing the second optical pump signal; and
- amplifying the first signal portion that is desired.

19. The optical signal processing method of claim 17, further comprising:
- receiving the first optical signal prior to the step of the modulating; and
- receiving a second radio frequency signal comprising the information prior to the modulating,
- wherein a power level of the first optical pump signal is less than a Brillouin threshold power.

* * * * *